Dec. 25, 1962 M. G. KING 3,069,899
PNEUMATIC GAUGES FOR MEASURING BORE DIAMETERS OF WORKPIECES
Filed Sept. 13, 1960
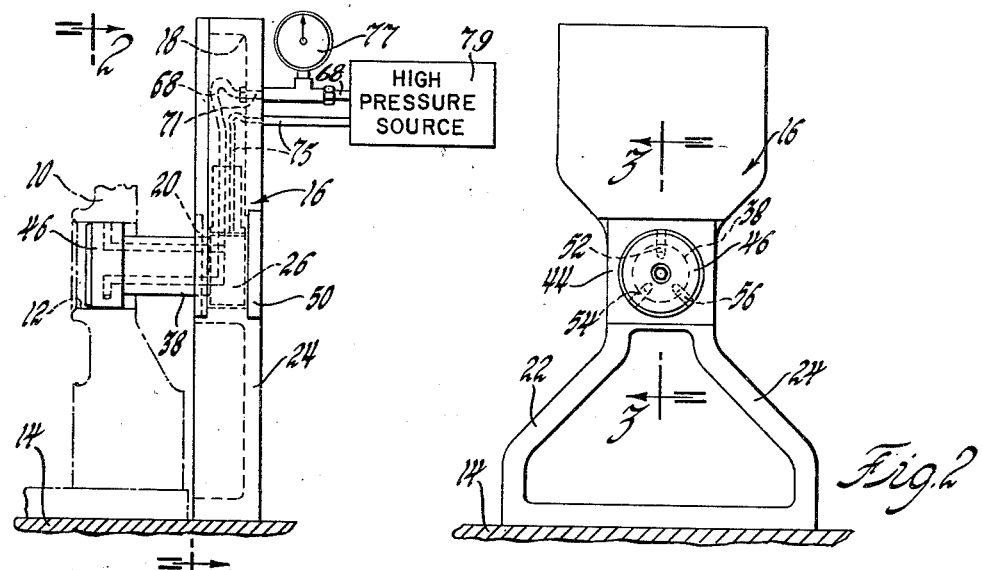
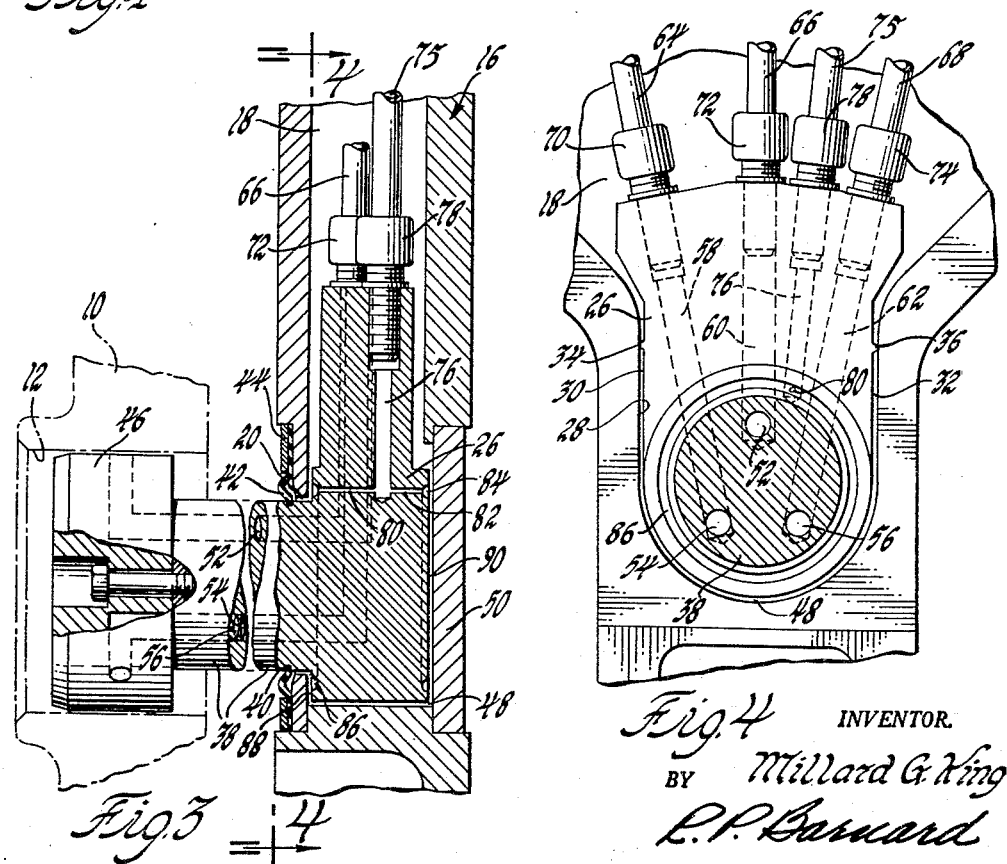
INVENTOR.
Millard G. King
BY
L. P. Barnard
ATTORNEY

United States Patent Office 3,069,899
Patented Dec. 25, 1962

3,069,899
PNEUMATIC GAUGES FOR MEASURING
BORE DIAMETERS OF WORKPIECES
Millard G. King, Lansing, Mich., assignor to General
Motors Corporation, Detroit, Mich., a corporation of
Delaware
Filed Sept. 13, 1960, Ser. No. 55,775
3 Claims. (Cl. 73—37.9)

This invention relates to pneumatic gauges and more particularly to an improved pneumatic gauge probe support.

Pneumatic gauges for determining bore diameters by measurement of air flow between a cylindrical probe adapted to be mounted in the bore to be measured and the circumjacent bore surface are well known in the art. Gauges of this type generally comprise a cylindrically shaped probe which is provided with peripheral exhaust ports to which a source of fluid pressure is connected. The exhaust ports are generally provided with means to restrict air flow therethrough. A pressure indicator is connected to the conduit and normally shows a back pressure due to the restriction in the exhaust ports. The cylindrical probe has a diameter which is nearly equal to the diameter of the bore to be measured so that when the probe is placed within the bore, air flow through the ports in the probe is further restricted to increase back pressure in the conduit and cause the indicator to be adjusted accordingly.

It is common practice to design support structure for a particular measuring operation. The gauge may be secured to a support surface located a fixed distance from the bore or bores of the workpieces to be tested which are generally supported on a fixed surface adjacent the probe. In this manner the workpieces may be rapidly tested by axial movement of the gauge probe into measuring position within the workpiece bores.

In many applications the bore surfaces in the workpieces to be measured are highly polished. Since the gauge and the workpiece are supported on fixed surfaces, normal dimensional variations in bore diameters and locations from workpiece to workpiece often cause misalignment of the bore to be measured relative to the probe of the gauge. Consequently, precision surfaces such as crankshaft bores have been seriously marred during insertion of the gauge probe into the bore of the workpiece.

An object of this invention is to provide a pneumatic gauge which is designed to overcome objectionable frictional engagement of the gauge probe with the peripheral surface of a bore to be measured. It is a further object of this invention to provide an air gauge probe which is floatingly supported relative to the workpiece in a unique manner to compensate for dimensional variations of production type workpieces. Still another object of this invention is to provide improved gauging apparatus which is of simple construction and utilizes existing gauge components to allow variable positioning of the gauge probe relative to a gauge support.

Other objects and advantages of this invention are disclosed in the following detailed description of an illustrative embodiment of the present invention as shown in the accompanying drawing wherein:

FIGURE 1 is a side elevational view of an illustrative embodiment of the present invention;

FIGURE 2 is an end view of the apparatus shown in FIGURE 1;

FIGURE 3 is a sectional view taken along the line 3—3 in FIGURE 2; and

FIGURE 4 is a partial enlarged sectional view taken substantially along the line 4—4 in FIGURE 3.

Referring now to FIGURE 1, a workpiece 10 having a bore 12 is supported on a fixed surface 14. A gauge stand 16 is movably supported on a fixed surface such as the surface 14 adjacent the workpiece 10 and is provided with a gauge cavity 18 and a centrally located transverse probe port 20. The bracket 16 is provided with suitable support means such as support legs 22, 24. The configuration of the support bracket may be modified to meet any test conditions and, if desired, the support bracket 16 may be suspended from an overhead rail by any conventional means rather than supported on the surface 14.

Referring now to FIGURES 3 and 4, the gauge comprises a floating block portion 26 having a cylindrical base which is retained in a pocket 28 at the lower end of the cavity 18 and an outwardly upwardly extending flange. The pocket 28 is dimensioned and contoured to be closely spaced around the side surfaces 30, 32 of the flange and the bottom surface of the cylindrical base. Ridges 34, 36 may be provided on the side surfaces 30, 32 to space and guide the floating block 26 within the pocket 28. The ridges 34, 36 may be located in other suitable positions or other guide means may be provided depending on the direction of floating movement desired. A probe shaft 38 is integrally formed with and extends outwardly from the floating block portion 26 through the probe hole 20. A groove 40 is provided on the probe shaft 38 adjacent the probe port 20 and receives a flexible seal 42 which is secured to the adjacent surface of the bracket 16 by a sealing retaining ring 44. The flexible seal 42 may be secured to the probe shaft 38 in any suitable manner to provide a sealed joint. A probe head 46 having a diameter slightly smaller than the diameter of the workpiece 12 is detachably secured to the probe shaft 38 in any conventional manner so that probe heads of different sizes may be interchanged to accommodate different sized workpiece bores.

An aassembly port 48 is provided in the bracket 16 opposite the probe port 20 and is sealingly covered by a cover plate 50. A plurality of air passages 52, 54, 56 are provided in the probe shaft 38 and are connected to corresponding air passages in the probe head 46 which terminate in orifices about the periphery of the gauge head in a conventional manner. The passages 52, 54, 56 are connected to transverse passages 58, 60, 62 within the floating block portion 26. Conduits 64, 66, 68 are connected to the passages 58, 60, 62 through suitable coupling means 70, 72, 74 within the cavity 18 and extend upwardly within the cavity 18 to a plurality of inlet ports 71 provided in the adjacent bracket wall. Suitable indicator gauges 77 are threadedly secured within the inlet ports 71 or otherwise suitably fastened to the bracket 16 and are responsive to air flow in the conduits 64, 66, 68 from a conventional pressure source 79.

An air conduit 75 also extends from the pressure source and into the cavity 18. The conduit 75 is connected to a passage 76 within the floating block 26 by suitable coupling means 78. The passage 76 communicates with transverse passages 80, 82 which terminate in circular grooves 84, 86 that open outwardly along the side surfaces 88, 90 of the cylindrical base of the floating block portion 26.

In operation the floating block 26 is supported within the pocket 28 of the gauge cavity 18 by high pressure air continuously supplied through the conduit 75, the passages 76, 80, 82 and the grooves 84, 86. The cavity 18 and the pocket 28 are sealed to prevent the rapid escape of high pressure air by means of the seal 42 surrounding the probe shaft 38 and by suitable sealing engagement of the cover plate 50 and the conduits 64, 66, 68, 75 with the adjacent bracket wall. In this manner the probe head 46 has limited movement relative to the support bracket 16 and variations in location of the bores of a plurality of workpieces are accommodated without frictional engagement of the probe and bore surface to prevent marring and scratching of the bore surfaces.

Obvious modifications of the details of construction and arrangement of the parts are intended to be within the scope of the appended claims except insofar as limited by the prior art.

In the claims:

1. In a device for testing the size and character of bores of a plurality of workpieces, the combination of probe means adapted to be inserted within said bores for measurement thereof, a bracket for supporting said probe means relative to said bores in said workpieces, said bracket being supported a fixed distance from said bores, a pocket formed within said bracket and contoured and dimensioned to receive a portion of said probe means in closely spaced relation to the side walls of said pocket, and air pressure delivery means connected to said pocket between the side walls thereof and said portion of said probe means to supply high pressure air to said pocket and floatingly support said probe means therein on a cushion of air to permit limited movement of said probe means relative to the fixed position of said bracket to accommodate dimensional variations of said workpieces.

2. The device as defined in claim 1 and wherein said said probe means comprises a base member, said base member further comprising said portion of said probe means and an air passage portion extending therefrom, said air passage portion having air passage means provided therein, a probe head removably secured to said air passage portion and having air passage means therein which are connectable to said air passage means in said air passage portion, said bracket having a port for said air passage portion and extending from said pocket, said port being sufficiently larger than said air passage portion to permit movement therebetween, said air passage portion extending through said port when said portion of said probe means is positioned within said pocket, and flexible sealing means extending between said air passage portion and a bracket surface adjacent said port to prevent air flow from said pocket through said port and simultaneously permit movement of said air passage portion relative to said port.

3. The device as defined in claim 1 and wherein said portion of said probe means comprises a cylindrical base, said pocket having an arcuate lower surface dimensioned to be spaced closely adjacent the lower surface of said cylindrical base, said portion of said probe further comprising a flange extending outwardly from said cylindrical base opposite the lower surface thereof, said flange having opposite parallel side surfaces extending longitudinally from said cylindrical base, said pocket having opposite parallel side surfaces extending tangentially outwardly from said arcuate lower surface and being dimensioned to be spaced closely adjacent said opposite parallel side surfaces of said flange, said high pressure air delivery means being connected to air passages in said flange, said air passages in said flange extending into said cylindrical base and terminating at spaced points on the periphery thereof to supply high pressure air to the space between said pocket and said cylindrical base and thereby floatingly support said probe means.

References Cited in the file of this patent
UNITED STATES PATENTS

| | | |
|---|---|---|
| 2,345,732 | Davies et al. | Apr. 4, 1944 |
| 2,477,889 | Minix | Aug. 2, 1949 |
| 2,572,368 | Minix | Oct. 23, 1951 |
| 2,943,477 | Segerstad | July 5, 1960 |